United States Patent
Creeden et al.

(10) Patent No.: US 9,620,924 B1
(45) Date of Patent: Apr. 11, 2017

(54) REDUCTION OF YB-TO-ER BOTTLENECKING IN CO-DOPED FIBER LASER AMPLIFIERS

(71) Applicant: BAE Systems Information and Electronic Systems Integration Inc., Nashua, NH (US)

(72) Inventors: Daniel J. Creeden, Nashua, NH (US); Julia R. Limongelli, Londonderry, NH (US); Hermanus S. Pretorius, Hooksett, NH (US); Scott D. Setzler, New Boston, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/016,626

(22) Filed: Feb. 5, 2016

(51) Int. Cl.
*H01S 3/067* (2006.01)
*H01S 3/094* (2006.01)
*H01S 3/16* (2006.01)
*H01S 3/0941* (2006.01)

(52) U.S. Cl.
CPC .......... *H01S 3/0941* (2013.01); *H01S 3/0675* (2013.01); *H01S 3/06708* (2013.01); *H01S 3/06754* (2013.01); *H01S 3/094003* (2013.01); *H01S 3/1608* (2013.01); *H01S 3/1618* (2013.01)

(58) Field of Classification Search
CPC ............. H01S 3/0941; H01S 3/094003; H01S 3/06708; H01S 3/0675; H01S 3/06754; H01S 3/1608; H01S 3/1618
See application file for complete search history.

(56) References Cited

U.S. PATENT DOCUMENTS

| | | | | |
|---|---|---|---|---|
| 5,867,305 | A * | 2/1999 | Waarts ................ | H01S 3/06754 359/337.12 |
| 2003/0142395 | A1* | 7/2003 | MacCormack ..... | H01S 3/06754 359/341.3 |
| 2007/0064304 | A1* | 3/2007 | Brennan ............. | H01S 3/06754 359/333 |
| 2009/0201953 | A1* | 8/2009 | Peyghambarian .. | C03B 37/0122 372/6 |
| 2011/0305256 | A1* | 12/2011 | Chann ................ | G02B 27/0905 372/75 |
| 2011/0306956 | A1* | 12/2011 | Islam ..................... | A61B 18/20 606/15 |
| 2012/0057220 | A1* | 3/2012 | Langseth ............. | H01S 3/0675 359/341.3 |

OTHER PUBLICATIONS

Zhang et al., Resonantly cladding-pumped Yb-free Er-doped LMA fiber laser with record high power and efficiency, Mar. 14, 2011 / vol. 19, No. 6 / Optics Express, pp. 5574-5578.

(Continued)

*Primary Examiner* — Eric Bolda
(74) *Attorney, Agent, or Firm* — Davis & Bujold, PLLC

(57) ABSTRACT

The system and method for reducing Yb to Er bottlenecking in a single frequency Er:Yb-doped fiber laser amplifier. The system is pumped off peak at about 935-955 nm. The off-peak pumping reduces bottlenecking and increases the optical and slope efficiency of the system by about 10% as compared to an EYDFA system pumped on-peak.

14 Claims, 9 Drawing Sheets

(56) References Cited

OTHER PUBLICATIONS

Dawson et al., Analysis of the scalability of diffraction-limited fiber lasers and amplifiers to high average power, Aug. 18, 2008 / vol. 16, No. 17 / Optics Express, pp. 13240-13266.
Kuhn et al., Stabilization and power scaling of cladding pumped Er:Yb-codoped fiber amplifier via auxiliary signal at 1064 nm, Sep. 28, 2009 / vol. 17, No. 20 / Optics Express, pp. 18304-18311.
Shen et al., Highly efficient Er,Yb-doped fiber laser with 188W free-running and > 100W tunable output power, Jun. 27, 2005 / vol. 13, No. 13 / Optics Express, pp. 4916-4921.
Nufem presentation, Progress on High Power Single Frequency Fiber Amplifiers at 1mm, 1.5mm and 2mm, pp. 1-62.
Supradeepa et al., Continuous wave Erbium-doped fiber laser with output power of >100 W at 1550 nm in-band core-pumped by a 1480nm Raman fiber laser, CLEO Technical Digest 2012.

\* cited by examiner

REDUCTION OF YB-TO-ER BOTTLENECKING IN CO-DOPED FIBER LASER AMPLIFIERS

FIELD OF THE DISCLOSURE

The present disclosure relates to Yb to Er co-doped fiber laser amplifiers and more particularly to a method of reducing inefficiency at high power levels by pumping off-peak of the Yb absorption.

BACKGROUND OF THE DISCLOSURE

Co-doping of ytterbium (Yb) with erbium (Er) has enabled power scaling in the 1550 nm spectral region. However, several issues, such as bottlenecking of the energy transfer, as well as quantum inefficiency, have limited significant power scaling of these co-doped fibers. To overcome this limitation, resonant pumping has been demonstrated, with high efficiency. Yet, this approach requires a 1470-1535 nm pump source and a long length of fiber to overcome bleaching effects. The long fiber length can limit the power scaling for single frequency applications. In addition, 1470-1535 nm pump sources are either fiber-based (via Raman conversion) or diode-based with low brightness. Although these approaches can be beneficial for very high power scaling due to the low quantum defect, the long fiber length can limit the overall efficiency for moderate power applications.

It has been recognized that typical high power Er:Yb co-doped fiber laser amplifiers (EYDFA) suffer from inefficiency at high power levels. This is due, in part, to the bottlenecking process which occurs when the excited Yb ions cannot transfer energy quickly to the Er ions, thus promoting the Yb ions to lase. As disclosed herein, by distributing the pump absorption, a significant improvement in the efficiency of these co-doped fibers systems can be realized by reducing the bottlenecking effect.

SUMMARY OF THE DISCLOSURE

One aspect of the present disclosure is a method of reducing Yb to Er bottlenecking in a single-frequency Er:Yb-doped fiber laser amplifier (EYDFA) comprising, providing an Er:Yb-doped fiber having a length; providing a plurality of diodes in the range from 935 nm to 955 nm; pumping, the Er:Yb-doped fiber off peak with the plurality of diodes to reduce Yb to Er bottlenecking; pumping the Er:Yb-doped fiber with the plurality of diodes at a pump power; and producing an output power in the 1550 nm region, wherein the Er:Yb-doped fiber laser amplifier has an optical efficiency at least 7% higher than an EYDFA pumped on peak.

One embodiment of the method is wherein the Er:Yb-doped fiber is less than 10 m long.

One embodiment of the method is wherein the Er:Yb-doped fiber is 5 m long.

One embodiment of the method is wherein the plurality of diodes pump at 940 nm.

One embodiment of the method is wherein the pump power is from 300 W to 450 W.

One embodiment of the method is wherein the output power is from 150 W to 220 W.

One embodiment of the method is wherein the optical efficiency is at least 45%.

Another aspect for the present disclosure is a method of reducing Yb to Er bottlenecking in a single-frequency Er:Yb-doped fiber laser amplifier (EYDFA) comprising, providing an Er:Yb-doped fiber having a length; providing a plurality of diodes in the range from 935 nm to 955 nm; pumping the Er:Yb-doped fiber off peak with the plurality of diodes to reduce Yb to Er bottlenecking; pumping the Er:Yb-doped fiber with a plurality of diodes at a pump power; and producing an output power in the 1550 nm region, wherein the Er:Yb-doped fiber laser amplifier has a slope efficiency at least 7% higher than an EYDFA pumped on peak.

One embodiment of the method is wherein the Er:Yb-doped fiber is less than 10 m long.

One embodiment of the method is wherein the Er:Yb-doped fiber is 5 m long.

One embodiment of the method is wherein in the plurality of diodes pump at 940 nm.

One embodiment of the method is wherein the pump power is from 300 W to 450 W.

One embodiment of the method is wherein the output lower is from 150 W to 220 W.

One embodiment of the method is wherein the slope efficiency is at least 45%.

Another aspect of the disclosure is a system for reducing Yb to Er bottlenecking in a single-frequency Er:Yb-doped fiber laser amplifier (EYDFA) comprising, a single frequency distributed feedback fiber laser seed source, wherein the center wavelength is in the 1550 nm range; a single frequency fiber amplifier to boost power to at least a 10 W level; a collimator to prevent feedback and cross-talk between the amplifier stages; an Er:Yb-doped fiber laser amplifier that is less than 10 m long; and a plurality of diodes in the range from 935 nm to 955 nm for pumping the Er:Yb-doped fiber laser amplifier off-peak, wherein the system has an output power in the 1550 nm range from 150 W to 220 W.

One embodiment of the system is wherein the Er:Yb-doped fiber laser amplifier has a slope efficiency at least 7% higher than an EYDFA pumped on peak.

One embodiment of the system is wherein the slope efficiency at least 45%.

One embodiment of the system is wherein wherein the Er:Yb-doped fiber laser amplifier has an optical efficiency at least 7% higher than an EYDFA pumped on peak.

One embodiment of the system is wherein wherein the optical efficiency at greater than 45%.

One embodiment of the system is wherein the Er:Yb-doped fiber laser amplifier is 5 m long These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
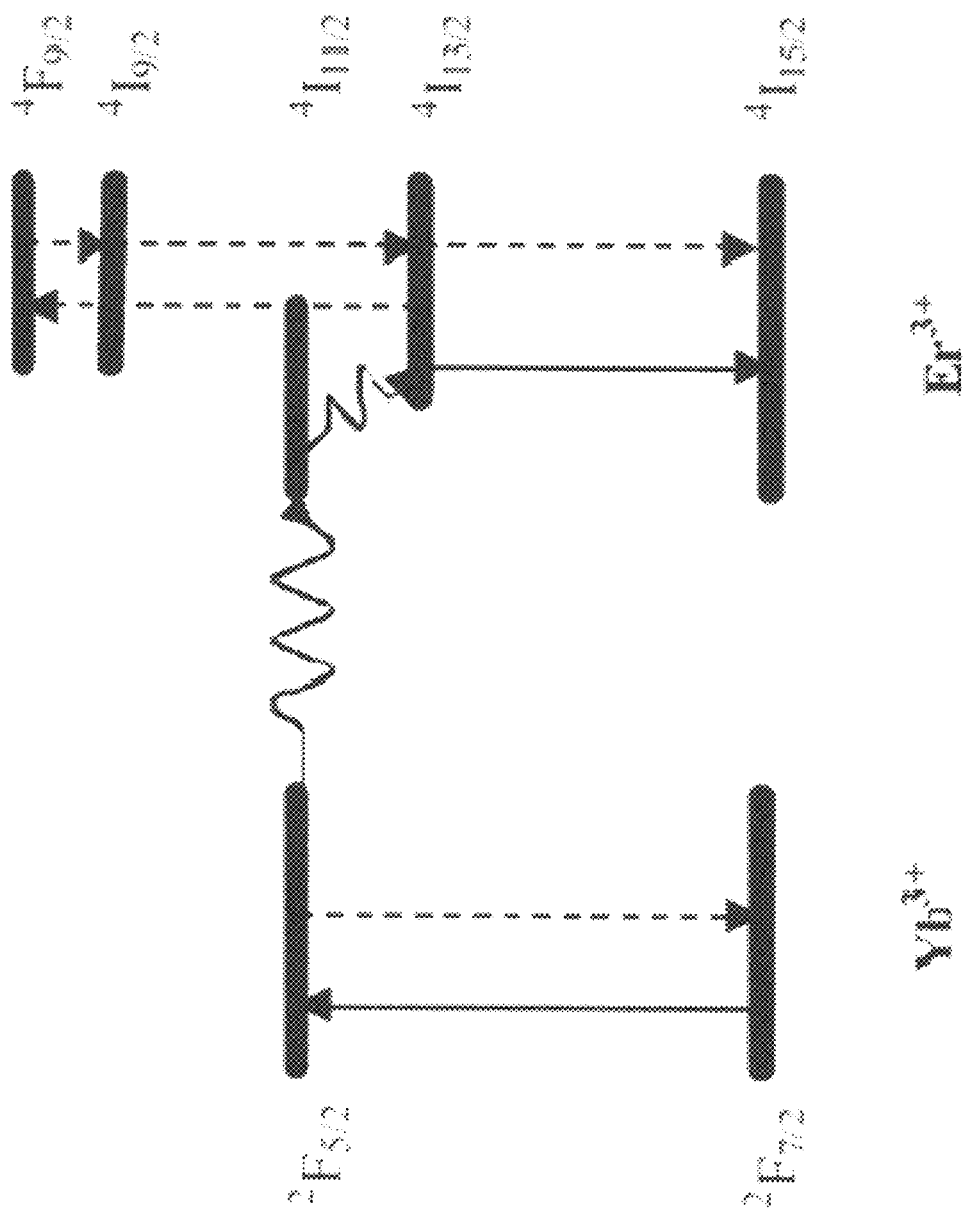
FIG. 1 shows a diagram of the energy transfer from Yb ions to Er ions.

High power fiber lasers and amplifiers in the 1550 nm spectral region have not scaled as rapidly as Yb-doped, Tm-doped, or Ho-doped fiber lasers. This is primarily due to the low gain (and pump absorption) of the erbium ion. To overcome the low pump absorption, Yb is typically added as a sensitizer. Although the addition of Yb helps the pump absorption, it also creates a problem with parasitic lasing of the Yb ions under very strong pumping conditions. This parasitic lasing generally limits output power.

Other pump schemes have shown high efficiency through resonant pumping without the need for Yb as a sensitizer. Although this can enable higher power scaling due to a decrease in the thermal loading in the fiber, resonant pumping methods require long fiber lengths due to pump bleaching. This limits the power scaling which can be achieved for single frequency output.

Co-doping of ytterbium with erbium has enabled some power scaling in the 1550 nm spectral region. However, several issues, such as bottlenecking of the energy transfer, as well as the quantum inefficiency have limited significant power scaling of these co-doped fibers. Typical Er:Yb co-doped fibers are pumped at 976 nm, in the peak of the Yb absorption band. This has the benefit of maximizing the pump absorption per unit fiber length, thus minimizing the length of fiber required. However, the strong pump absorption at 976 nm creates problems with bottlenecking of the energy transfer process from the Yb ions to the Er ions under strong pump conditions. In these cases, the Yb pump rate begins to exceed the energy transfer rate to the Er ions. As a result, the Yb inversion increases, which leads to amplified spontaneous emission (ASE) and/or self-lasing in the 1-micron band. ASE is produced when a laser gain medium is pumped to produce a population inversion. Feedback of the ASE by the lasers optical cavity may produce laser operation if the lasing threshold is reached. Excess ASE is an unwanted effect in lasers, since it is not coherent, and limits the maximum gain that can be achieved in the gain medium. ASE creates serious problems in any laser with high gain and/or large size. In this case, a mechanism to absorb or extract the incoherent ASE must be provided; otherwise the excitation of the gain medium will be depleted by the incoherent ASE rather than by the desired coherent laser radiation. This ultimately limits the power scaling which can occur at 1550 nm.

Resonant pumping at 1480-1532 nm has shown higher optical efficiencies without the need for Yb co-doping, thus eliminating the parasitic. However, longer fiber lengths (on the order of >10 m) are required due to bleaching effects. This can be problematic for single frequency power scaling due to stimulated Brillouin Scattering (SBS) limitations. In addition, 940 nm and 976 nm diodes are more readily available and more cost effective compared to 1480 nm and 1532 nm pump sources.

By pumping at 940 nm, in the minima of the Yb pump absorption band, as disclosed herein, the Yb inversion is distributed over a longer fiber length, thus reducing the bottleneck affect for the same pump power levels. This also reduces the thermal loading on the fiber, thus improving reliability. In certain embodiments, the system simultaneously generates high power in the 1560 nm range while suppressing the 1-micron amplified spontaneous emission (ASE) to enable higher efficiency compared to pumping at the absorption peak (976 nm). This results in a higher overall efficiency, as well as reduced 1-micron parasitics, for an embodiment of the high power 1550 nm Er:Yb co-doped fiber amplifier described herein.

Referring to FIG. 1, a diagram of the energy transfer from Yb ion to Er ion is shown. Bottlenecking occurs from the $^2F_{5/2}$ manifold to the $^4I_{11/2}$ manifold. As a result, the Yb ion tends to spontaneously emit or lase back down to the $^2F_{7/2}$ manifold, reducing efficiency. Bottlenecking occurs due to the energy transfer rates from the Yb to Er ions. This rate can be slow. As a result, if the Yb is pumped very strongly, the energy transfer from the Yb to the Er can "bottleneck" in that only some of the Yb ions transfer energy to the Er ions due to the slow transfer rate. As a result, the Yb inversion builds and the Yb begins to spontaneously emit in the 1-micron region. This process leads to amplified spontaneous emission (ASE) and even parasitic lasing in the 1-micron region, thus decreasing the efficiency of the 1550 nm transition.

Figure 2:
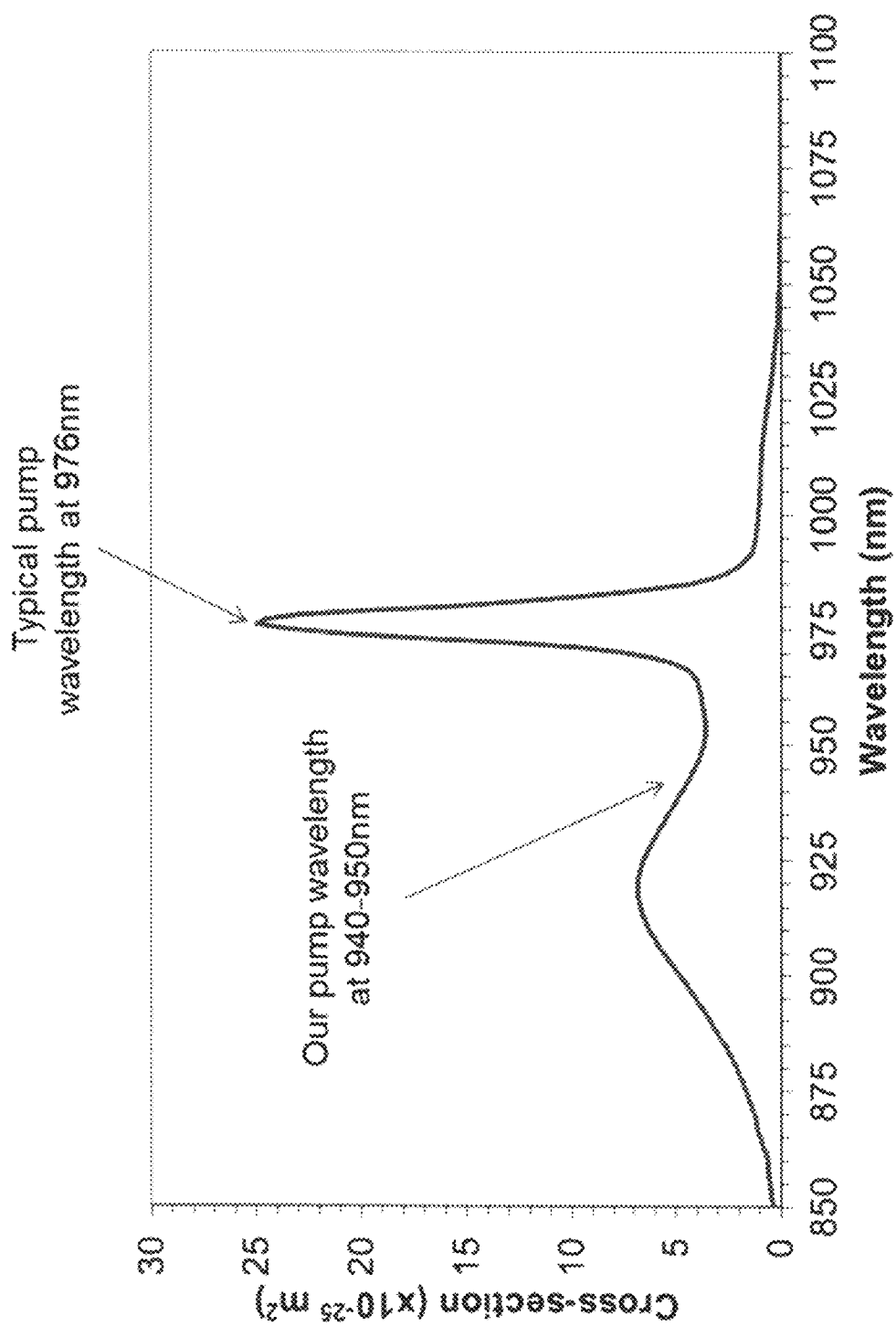
FIG. 2 shows a plot of Yb absorption cross-sections in silica fiber.

Referring to FIG. 2, a plot of Yb absorption cross-sections in silica fiber is shown. More particularly, the typical pump region of 976 nm is shown in contrast with the pump region utilized by the present method.

Figure 3A:
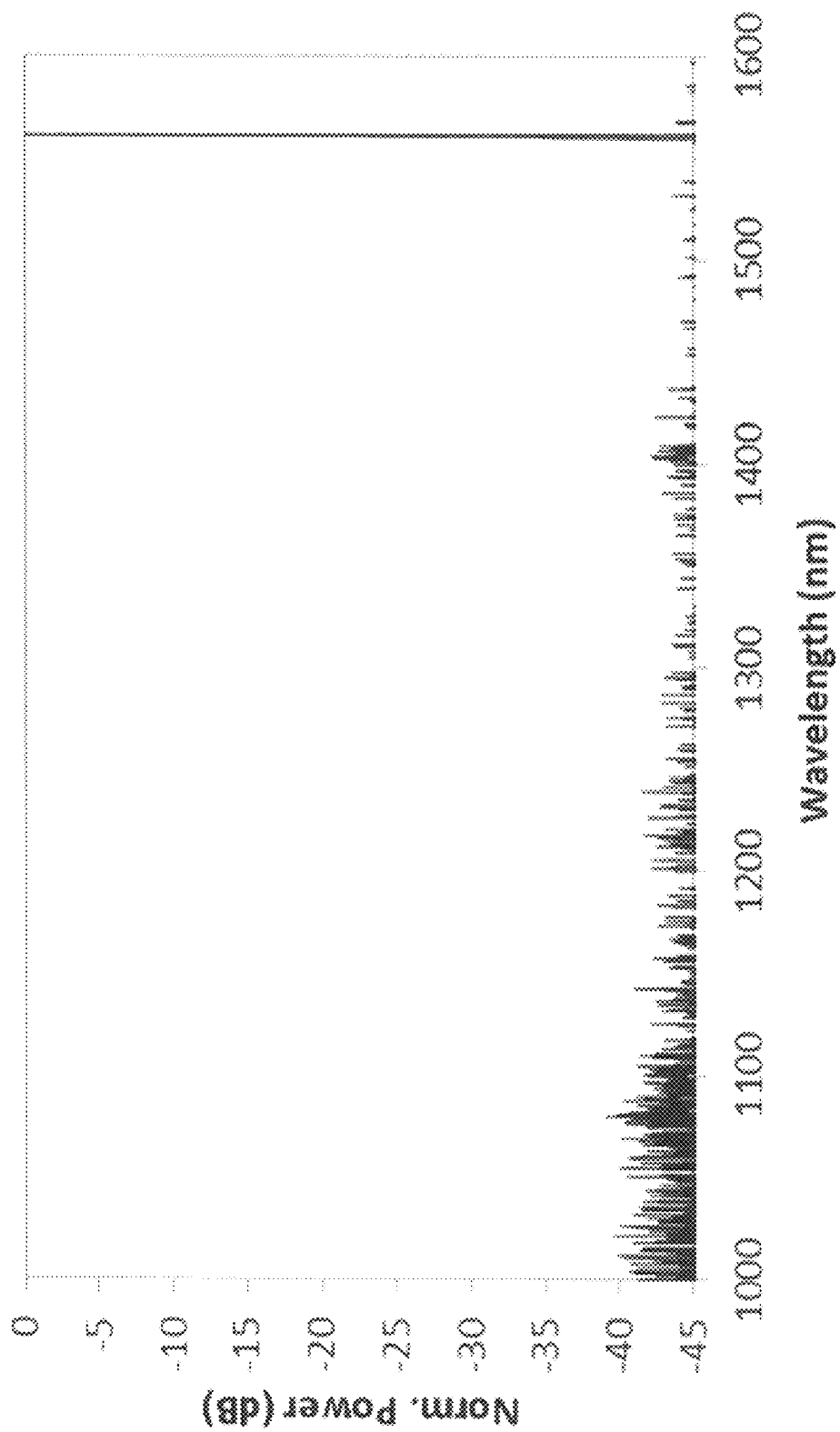
FIG. 3A shows the spectral output of one embodiment at 178 W output power, 1560 nm when pumped at 940 nm.
Figure 4A:
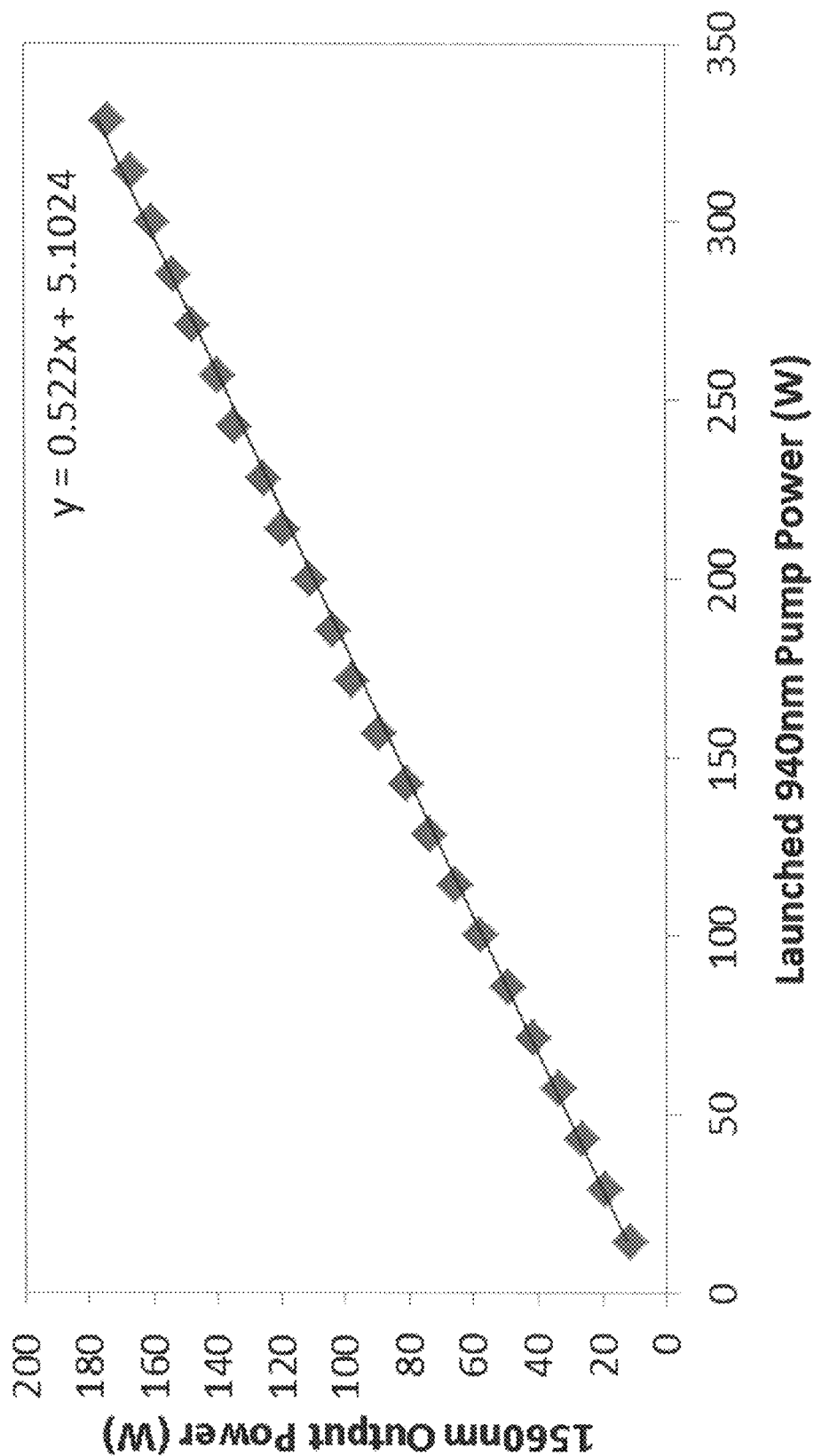
FIG. 4A shows the slope efficiency of one embodiment at 178 W output power, 1560 nm when pumped at 940 nm.
Figure 4B:
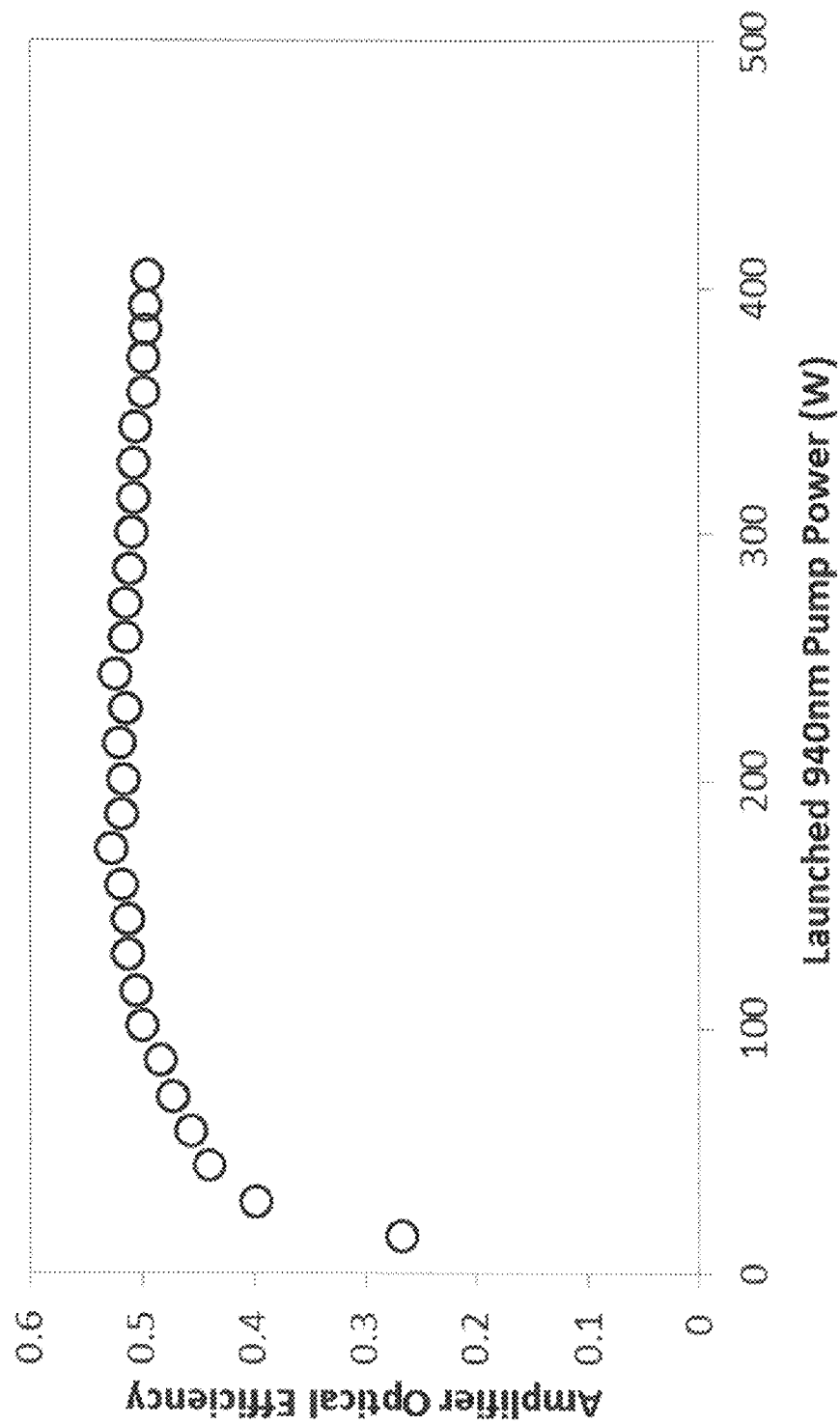
FIG. 4B shows the optical efficiency of one embodiment versus launched 940 nm pump power.

The performance of the 940 nm-pumped Er:Yb fiber amplifier of the present disclosure is shown in FIGS. 3A, 4A and 4B. Referring to FIG. 3A, the spectral output power at 178 W, 1560 nm when pumped at 940 nm is shown. Note there is no significant 1-micron ASE. The spectral output for the 940 nm pumped configuration is shown in FIG. 3A. There is little observable ASE show in the output spectrum across a broad bandwidth scan on an optical spectrum analyzer, covering both the Yb and Er emission bands. There appears to be some 1-micron ASE developing in the ~1080 nm region at more than 50 dB down from the peak emission. This indicates that further power scaling is possible prior to the onset of Yb parasitics.

Figure 3B:
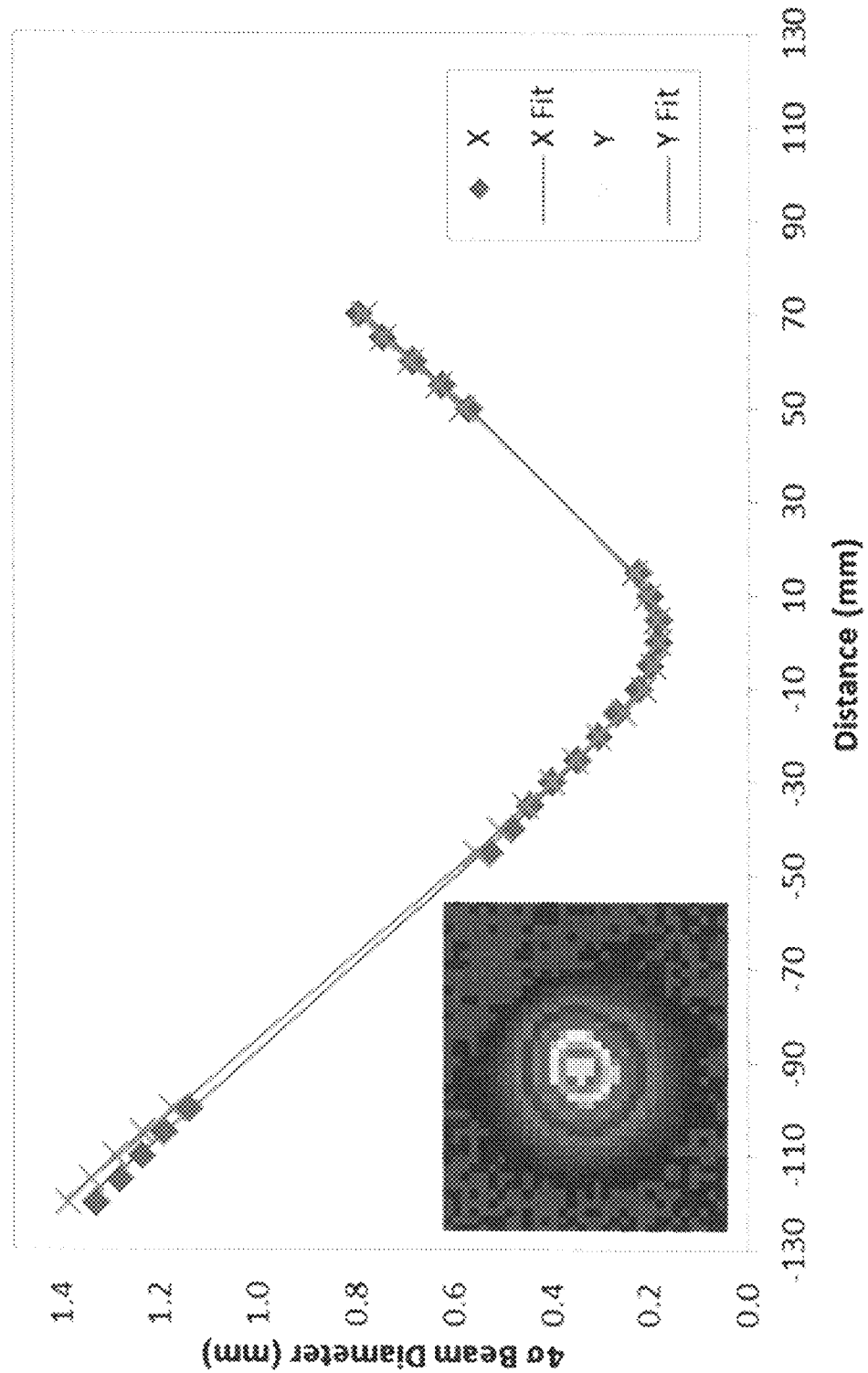
FIG. 3B shows the beam quality of one embodiment of an EYDFA at 207 W power level.

Referring to FIG. 3B, the beam quality of one embodiment of an EYDFA at a 207 W power level is shown. More particularly, the beam quality for one embodiment of the 940 nm-pumped configuration was measured at the 200 W power level by collimating the output from the amplifier, picking off a small fraction of that power using an uncoated wedge, and forming a waist through a lens. The waist was then magnified and re-imaged on a Pyrocam in order to measure the 4-sigma beam diameter through the near- and far-field of the beam. A Gaussian fit to that data allowed comparison of the measured values to that of an imbedded Gaussian to determine $M^2$. At full power, the maximum beam quality measured was an $M^2$ of 1.05. This high beam quality is an indication of the high quality splices achieved in assembling one embodiment of the amplifier disclosed herein. The beam profile inset in FIG. 3B shows the profile of the spatial distribution of the beam at the waist.

Figure 5A:
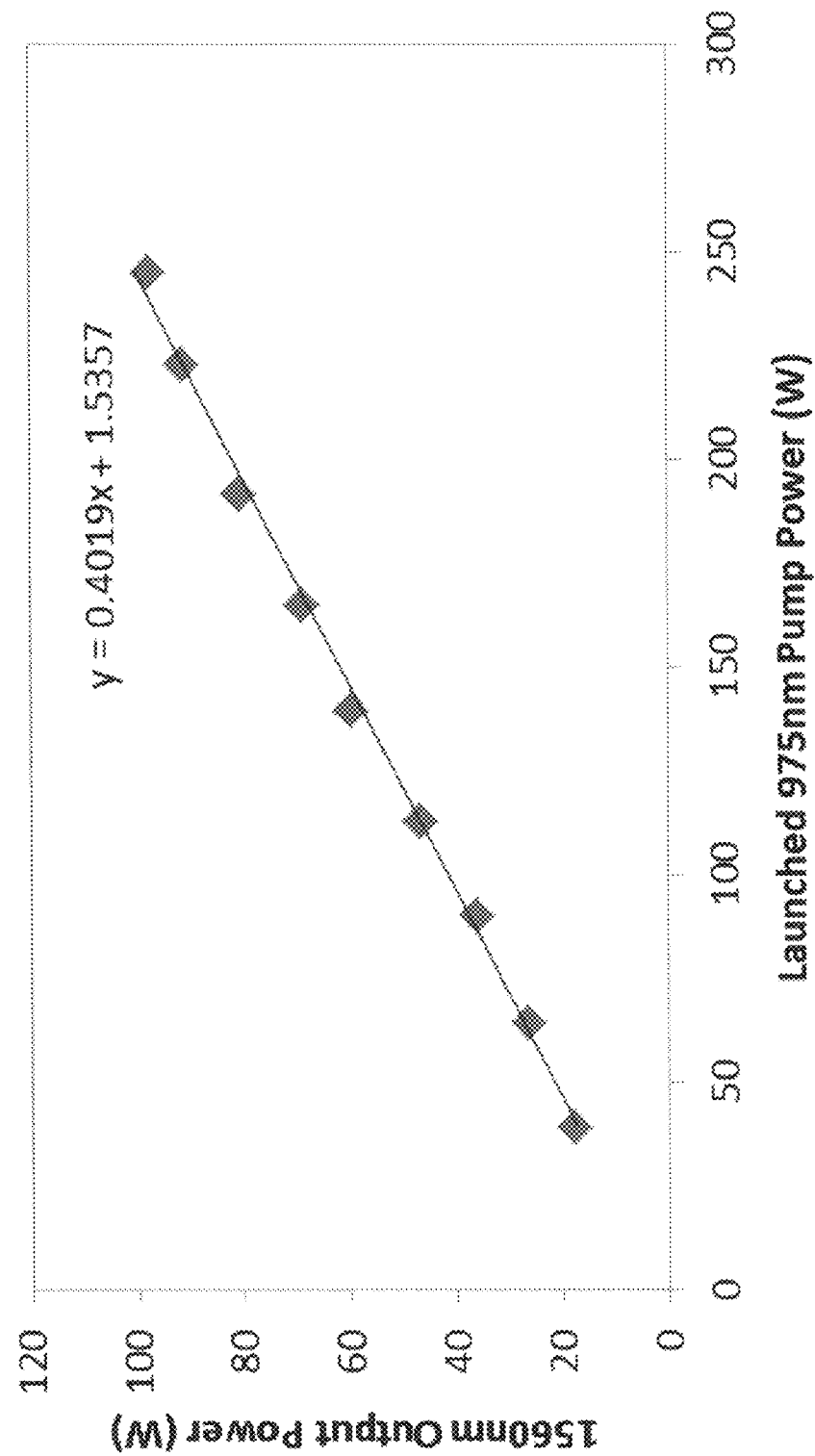
FIG 5A shows the slope efficiency lbs a EYDFA pumped at 976 nm.

Referring to FIG. 4A, the slope efficiency of one embodiment at 178 W output power, 1560 nm when pumping at 940 nm is shown. More particularly, note the high slope efficiency of 52.2% as a result of 940 nm pumping. This is in contrast to FIG. 5A showing a typical 975 nm pumped system. That system has a slope efficiency of about 40.2%. In certain embodiments, an increase in efficiency of about 10% is obtained with the present method.

In one embodiment, a continuous wave (CW) configuration pumped at 940 nm, achieved 207 W output at 1560 nm with 50.5% slope efficiency (49.3% optical efficiency) with respect to launched pump power, when seeded with 7.5 W of 1560 nm power. It was pumped with six 65 W 940 nm diodes. By pumping off-peak of the pump absorption at 940 nm, a significant increase in efficiency and output power was obtained as compared to known high power Er:Yb fiber amplifiers pumped in the 9XX nm region. The slope is shown in FIG. 4A, and the optical efficiency is shown in FIG. 4B.

In one embodiment, the pump power was measured at various diode drive levels through the pump combiner, prior to splicing the combiner to the Er:Yb-doped fiber. Fresnel reflections were accounted for in determining the actual pump power launched in to the amplifier. The slope is very linear for the full drive level, but the efficiency does appear to decrease at higher pump levels. This is most likely doe to the wavelength shifting in the diodes at high power. As the pump power was increased, the diodes shifted longer in wavelength, and the absorption decreased slightly as it moved along the Yb absorption (FIG. 2). All diodes were placed on a water-cooled cold plate and were run with 20° C. baseplate temperature. The wavelength span among the 6 pump diodes ranged from 938-952 nm. In certain embodiments, the absolute diode wavelength or wavelength overlap from diode-to-diode was not precisely controlled.

Referring to FIG. 5A, for comparison to the 940 nm-pumped results, another set of experiments pumped at 975 nm were run. In this case, a 97.6 W output power at 1560 nm with 40.2% slope efficiency and 35.6% optical efficiency was achieved. This is consistent with other amplifiers pumped at 976 nm. In this configuration, five 50 W 976 nm diodes were used as a pump source, for a total pump power of 250 W. The slope efficiency is shown in FIG. 5A, while the optical efficiency is shown in FIG. 5B.

Figure 5B:
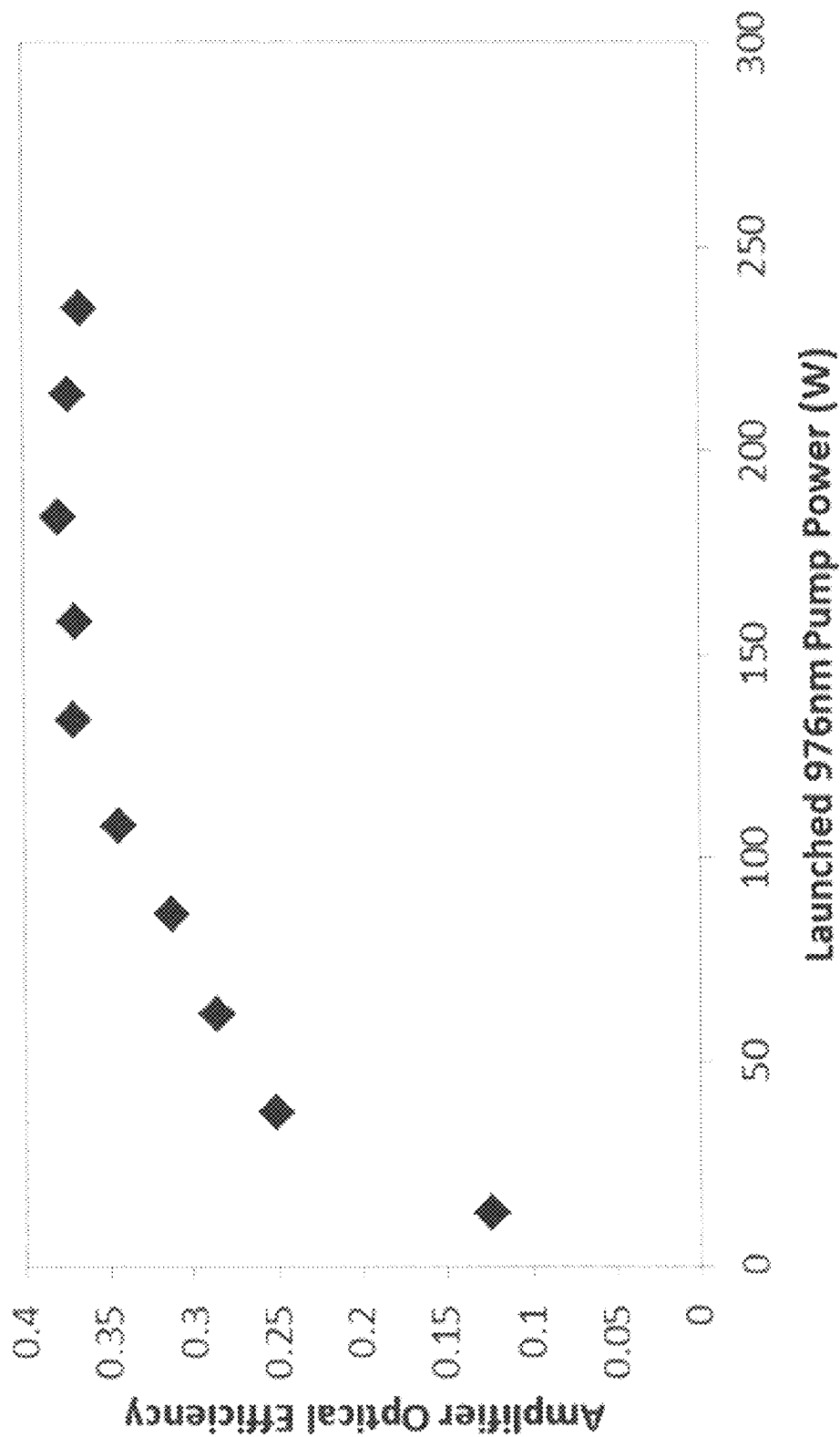
FIG. 5B shows the optical efficiency for an EYDFA versus launched 976 nm pump power.

Referring to FIG. 5B, the slope efficiency of the 1560 nm fiber amplifier when pumped with 976 nm diodes is shown. Note the lower slope efficiency in comparison to 940 nm pumping, Under 976 nm pumping, a shorter fiber length compared to the 940 nm-pumped case was used. In one embodiment, the 976 nm pumped case had a 1.3 m long fiber and the 940 nm pumped ease had a 5 m long fiber. In both cases, the same overall pump absorption was retained, thus keeping the absorption length nearly constant in both cases. Further power scaling at 976 nm was limited by the total amount of pump power available. In addition, the thermal loading was significantly higher in the 976 nm-pumped case, and fiber acrylate coating discoloration/degradation was observed near the pump-combiner splice to the Er:Yb-doped fiber. This indicated that further power scaling in this configuration would be limited and likely require improved thermal management.

Figure 6:
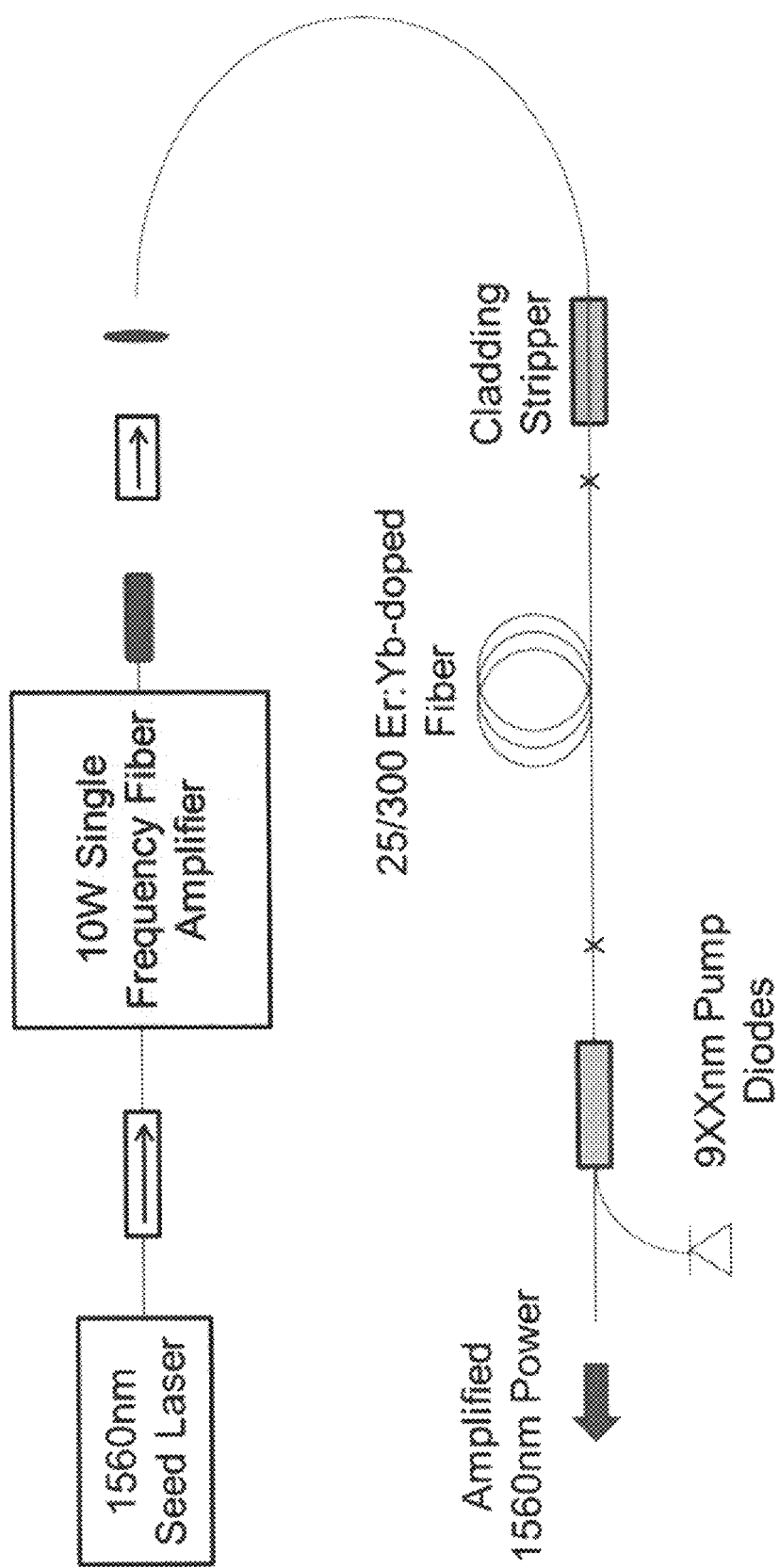
FIG. 6 shows a schematic of one embodiment of a high-power, single frequency Er:Yb fiber amplifier.

Referring to FIG. 6, an exemplary experimental setup is shown. More particularly, in one embodiment a single frequency distributed feedback fiber laser with a linewidth of 540 Hz as a seed source (e.g., NP Photonics) was used. The linewidth was inferred from a numerical fit to a delayed self-heterodyne measurement. The center wavelength was at 1560 nm. The seed laser was isolated and an off-the-shelf single frequency fiber amplifier was used to boost power to around a 10 W level. The output from the preamplifier was collimated and passed through a free-space optical isolator to prevent feedback and cross-talk between the amplifier stages. This was done in free-space as no fiber-coupled isolator was used. After isolation, 7.5 W was coupled from the preamplifier into a passive 25/300 Er:Yb fiber (e.g., Nufern). The coupling efficiency was measured through a cladding stripper, ensuring that all 7.5 W was in the core of the 25/300 fiber. The output from the cladding stripper was then spliced to a length of Er:Yb doped fiber, which was counter-pumped with 9XX nm diodes using a conventional (6+1)×1 combiner. Both the input and output to the 25/300 amplifier were angle cleaved at 8 degrees to eliminate back-reflections into the core. For this experiment, two different amplifier configurations were run. In one case, the system was pumped at 940 nm with 5 m of Er:Yb-doped fiber. For comparison, another system was pumped at 976 nm with a 1.3 m length of Er:Yb-doped fiber. In both cases, the total pump absorption was held constant at ~12 dB. The Er:Yb fiber was coiled in a non-overlapping spiral on a 12 inch cold-plate for cooling. The largest coil radius was about 6 inches.

Given the similar levels of pump absorption in each setup, the 940 nm-pumped amplifiers had significantly better overall performance due to the longer pump absorption and lower overall inversion per unit length, thus enabling higher power scaling. This was nearly 10% higher in optical efficiency than the best reported efficiency for Er:Yb doped fiber lasers/amplifiers. Single frequency amplification (540 Hz linewidth) to 207 W average output power with 49.3% optical efficiency (50.5% slope efficiency) in an LMA Er:Yb fiber is demonstrated herein. This is significantly more efficient that the best-reported efficiency for high power Er:Yb doped fibers, which, to-date, has been limited to ~41% slope efficiency.

In certain embodiments, the pump absorption at 940 nm is about 2× lower than at 976 nm. In certain embodiments, the pump absorption at 940 nm is about 5× lower than at 976 nm. The trade-off for the lower pump absorption is a longer fiber length. However, this has two distinct benefits. The first benefit is that the thermal loading per unit length is reduced, which can help mitigate excessive heating under strong pumping conditions. The second benefit is a reduction in the Yb inversion per unit length. This reduction allows for better energy transfer from the Yb ions to the Er ions, thus reducing the bottlenecking effect and improving overall efficiency compared to 976 nm pumping. The length of fiber required, although longer than 976 nm pumping, is still significantly shorter than for resonantly-pumped Er-doped fibers, which can be on the order of >20 m. The 940 nm pumping region is also very broad, which mitigates the need for precise wavelength control of the pump diodes.

Pumping at 976 nm, in the peak of the Yb absorption, has the benefit of minimizing the required fiber length for pump absorption. By pumping off-peak at 940 nm, a longer fiber length is required to efficiently absorb the pump. As a result, the Yb inversion versus length is lower compared to 976 nm pumping. At high pump powers, this reduces the bottlenecking of the energy-transfer from the Yb to the Er, which generally causes the rapid 1-micron ASE/lasing typically seen in 976 nm-pumped Er:Yb fibers. By pumping at 940 nm and distributing the gain over a slightly longer fiber length, we can avoid the bottlenecking problem for the same pump power levels, suppression 1-micron parasitics and improving the efficiency in the 15XX nm region, as demonstrated by our high slope and optical efficiency. For 940 nm pumping, the fiber length was about 3.8× longer than the 976 nm amplifier.

Resonant pumping has shown higher optical efficiencies without the need for Yb co-doping, thus eliminating the Yb parasitics. However, even longer fiber lengths are required due to pump bleaching effects. This can be problematic for single frequency power scaling due to Stimulated Brillouin Scattering (SBS) limitations. Given the, modest increase in fiber length from 976 nm to 940 nm pumping (e.g., 1.3 m vs. 5 m), the current method provides for power scaling and improved optical efficiency without reaching nonlinear limits.

In certain embodiments, the fiber length ranges from about 1 m to about 10 m. In certain embodiments, the fiber is about 1 m long. In certain embodiments, the fiber is about 2 m long. In certain embodiments, the fiber is about 3 m long, In certain embodiments, the fiber is about 4 m long. In certain embodiments, the fiber is about 5 m long. In certain embodiments, the fiber is about 6 m long. In certain embodiments, the fiber is about 7 m long. In certain embodiments, the fiber is about 8 m long. In certain embodiments, the fiber is about 9 m long. In certain embodiments, the fiber is about 10 m long.

In certain embodiments, the diodes pump off-peak at about 940 nm. In certain embodiments, the diodes pump off-peak over a range from about 875 nm to about 960 nm. In certain embodiments, the diodes pump off-peak over a range from about 900 nm to about 960 nm. In certain embodiments, the diodes pump off-peak over a range from about 935 nm to about 955 nm. In certain embodiments, the diodes pump off-peak over a range from about 938 nm to about 952 nm.

In certain embodiments, the pump power is from about 25 W to about 1000 W. In certain embodiments, the pump power is from about 300 W to about 700 W. In certain embodiments, the pump power is from about 300 W to about 420 W. In certain embodiments, the pump power is about 100 W. In certain embodiments, the pump power is about 200 W. In certain embodiments, the pump power is about 300 W. In certain embodiments, the pump power is about 400 W. In certain embodiments, the pump power is about 500 W. In certain embodiments, the pump power is about 600 W. In certain embodiments, the pump power is about 700 W. In certain embodiments, the pump power is about 800 W. In certain embodiments, the pump power is about 900 W. In certain embodiments, the pump power is about 1000 W.

In certain embodiments, the output power is from about 10 W to about 500 W. In certain embodiments, the output power is from about 100 W to about 400 W. In certain embodiments, the output power is from about 200 W to about 300 W. In certain embodiments, the output power is from about 160 W to about 207 W. In certain embodiments, the output power is about 50 W. In certain embodiments, the output power is about 100 W. In certain embodiments, the output power is about 150 W. In certain embodiments, the output power is about 200 W. In certain embodiments, the output power is about 250 W. In certain embodiments, the output power is about 300 W. In certain embodiments, the output power is about 350 W. In certain embodiments, the output power is about 400 W. In certain embodiments, the output power is about 450 W. In certain embodiments, the output power is about 505 W.

In certain embodiments, the slope efficiency is greater than 45%. In certain embodiments, the slope efficiency is about 50%. In certain embodiments, the slope efficiency is about 55%. In certain embodiments, the slope efficiency is about 60%.

In certain embodiments, the optical efficiency is greater than 45%. In certain embodiments, the optical efficiency is about 50%. In certain embodiments, the optical efficiency is about 55%. In certain embodiments, the optical efficiency is about 60%.

In certain embodiments, the 1550 nm range output is continuous. In certain embodiments, the 1550 nm range output is modulated or pulsed.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method of reducing Yb to Er bottlenecking in a single-frequency Er:Yb-doped fiber laser amplifier (EY-DFA) comprising,
    providing a plurality of diodes producing light having a wavelength in the range from 935 to 955 nm;
    pumping the Er:Yb-doped fiber off peak at about 940 nm with the plurality of diodes to reduce Yb to Er bottlenecking, the Er:Yb-doped fiber having a length greater than 5 m;
    pumping the Er:Yb-doped fiber with the plurality of diodes at a pump power; and
    producing an output power in the 1550 nm region, wherein the Er:Yb-doped fiber laser amplifier has an optical efficiency greater than 50%.

2. The method of claim 1, wherein the Er:Yb-doped fiber is less than 10 m long.

3. The method of claim 1, wherein the pump power is greater than 300 W.

4. The method of claim 1, wherein the output power is greater than 150 W.

5. The method of claim 1, wherein the Er:Yb-doped fiber laser amplifier has a slope efficiency greater than 50%.

6. A method of reducing Yb to Er bottlenecking in a single-frequency Er:Yb doped fiber laser amplifier (EY-DFA) comprising,
    providing an Er:Yb-doped fiber having length greater than 5 m;
    providing a plurality of diodes producing light having a wavelength in the range from 935 nm to 955 nm;
    pumping the Er:Yb-doped fiber off peak at about 940 nm with the plurality of diodes to reduce Yb to Er bottlenecking;
    pumping the Er:Yb-doped fiber with a plurality of diodes at a pump power, and
    producing an output power in the 1550 mn region, wherein the Er:Yb doped fiber laser amplifier has a slope efficiency greater than 50%.

7. The method of claim 6, wherein the Er:Yb-doped fiber is less than 10 m long.

8. The method of claim 6, wherein the pump power is greater than 300 W.

9. The method of claim 6, wherein the output power is greater than 150 W.

10. The method of claim 6, wherein the Er:Yb-doped fiber laser amplifier has an optical efficiency greater than 50%.

11. A system for reducing Yb to Er bottlenecking in a single-frequency Er:Yb-doped fiber laser amplifier (EYDFA) comprising,
- a single frequency distributed feedback fiber laser seed source, wherein the center wavelength is in the 1550 nm range;
- a single frequency fiber amplifier to boost power to at least a 10 W level:
- a collimator to prevent feedback and cross-talk between the amplifier stages;
- an Er:Yb-doped fiber laser amplifier that is greater than 5 m long; and
- a plurality of diodes producing light having a wavelength in the range from 935 nm to 955 nm for pumping the Er:Yb doped fiber laser amplifier off-peak at about 940 nm at a pump power, wherein the system has an output power in the 1550 nm range greater than 150 W, to slope efficiency greater than 50% and an optical efficiency greater than 50%.

12. The system of claim 11, wherein the Er:Yb-doped fiber laser amplifier has a slope efficiency at least 7% higher than an EYDFA pumped on peak.

13. The system of claim 11, wherein the Er:Yb-doped fiber laser amplifier has an optical efficiency at least 7% higher than an EYDFA pumped on peak.

14. The system of claim 11, wherein the pump power is greater than 300 W.

\* \* \* \* \*